United States Patent [19]
Pritschow

[11] Patent Number: 6,070,335
[45] Date of Patent: Jun. 6, 2000

[54] APPARATUS FOR DETERMINING THE POSITION OF A TOOL HOLDER AND/OR A WORKPIECE HOLDER

[76] Inventor: Günter Pritschow, Grünewaldstr. 38B 70192, Stuttgart, Germany

[21] Appl. No.: 08/974,567

[22] Filed: Nov. 19, 1997

[51] Int. Cl.[7] .................. B23Q 16/00; B43L 5/00
[52] U.S. Cl. ................ 33/568; 33/1 M; 33/DIG. 21
[58] Field of Search ............... 33/1 M, 568, DIG. 21, 33/201, 503, 626

[56] References Cited

U.S. PATENT DOCUMENTS

| | | | |
|---|---|---|---|
| 4,483,074 | 11/1984 | Rudzyanskas et al. | 33/1 M |
| 5,333,386 | 8/1994 | Breyer et al. | 33/1 M |
| 5,603,243 | 2/1997 | Finey | 33/1 M |
| 5,724,745 | 3/1998 | Brenner et al. | 33/503 |

*Primary Examiner*—Randy W. Gibson
*Attorney, Agent, or Firm*—Robert W. Becker & Associates

[57] ABSTRACT

An apparatus for detecting the position of a holder for a tool or a workpiece has a frame and drive units connected to the frame. Rods connect the drive units to the holder. At least one load-free measuring arm is freely extendable between two measuring points. Elements for detecting a position of the at least one measuring arm within a reference space are provided.

19 Claims, 2 Drawing Sheets

APPARATUS FOR DETERMINING THE POSITION OF A TOOL HOLDER AND/OR A WORKPIECE HOLDER

BACKGROUND OF THE INVENTION

The invention relates to an apparatus for determining the position of a tool holder and/or workpiece holder.

Devices are known with which the tool holder and/or workpiece holder is pivotably connected by parallel rod kinematic systems to drive units. The parallel rod kinematic systems have rods that are parallel to one another and are connected with their ends movably to the tool holder and/or workpiece holder which is embodied as a supporting platform in the form of a tool center point (TCP) for receiving a workpiece and/or a tool. The parallel rods are movable at their ends in three degrees of freedom whereby depending on the construction one through three of these degrees of freedom are used as positioning axes. The position of the tool holder and/or workpiece holder is not directly determined but indirectly by detecting the position of the drive units. Accordingly, deviations of the position of the tool and/or workpiece holder from the desired position, for example, resulting from deflection forces, acceleration forces or thermal expansion of the rods cannot be detected, so that incorrect machining results.

It is an object of the invention to embody the apparatus of the aforementioned kind such that deviations of the tool holder and/or workpiece holder from the nominal position can be reliably detected.

SUMMARY OF THE INVENTION

In the inventive apparatus the load-free measuring arm serves for detecting the position of the tool holder and/or workpiece holder. It is not aligned by positioning drives, but is able to freely align between two reference points or reference lines. In this context, the position of the degrees of freedom of the measuring arm relative to its reference points or reference lines is detected, and one of the reference points is correlated with the tool holder and/or workpiece holder and the other reference point is correlated with a known position within the reference space, respectively, within the apparatus. As soon as the position of the tool holder and/or workpiece holder as well as the orientation of the rods supporting this holder deviate from a predetermined nominal position, this results in a position and orientation change of the load-free measuring arm. Its position and orientation is detected and evaluated so that the deviating position of the tool holder and/or workpiece holder is detected and optionally corrected.

The measuring technological initial position of the parallel kinematic system for a two-dimensional situation is shown in FIG. 1. The position of the platform TCP in the spaceof the parallel kinematic system L1, L2 with the drive carriages A1, A1 can be calculated based on the position of the drives A1, A2 and the construction dimensions of the parallel kinematic system. The machine measurements, however, do not match completely the theoretical construction dimensions. Deviations exists because of manufacturing errors and because of processing forces acting on the platform TCP that can be a tool or workpiece carriages A1, A2 and the platform TCP. Furthermore, the length of the rods of the parallel kinematic system L1, L2 changes because of thermal effects leading to deviations from the construction dimensions. These deviations lead to an actual position of the platform TCP that differs from the calculated (nominal) position.

in order to determine the actual position, it is suggested by the present invention to provide an identical, but stress or load-free parallel kinematic system M1, M2, (M), MA1, MA2, (MA3) in an arrangement parallel to the loaded parallel kinematic system L1, L2, (L3) (see FIG. 2). The stress-free parallel kinematic system M 1–M2, MA1–MA2 or M1–M3, MA1–MA3 can be entrained by the kinematic system L1–L2 or L1–L3 either by centrally coupling the platforms TCP and TCP' or by coupling the carriages A1 to M1 etc. The position determination, and optionally the orientation determination, of the parallel kinematic system M1–M3, MA1–MA3 then allows a quasi direct position determination, and optionally orientation, of the platform TCP of the loaded parallel kinematic system L1–L3.

Inasmuch as the position of the platform TCP in the X-Y-Z space is to be determined, three independent measured values are required. When the orientation between the reference platform and the platform TCP is to be detected additionally, six measured values are required. The measured values may include combinations of length and angle measurements, for example, three carriage positions z1, z2, z3 or one carriage position z1 together with angles $\alpha_1$, and $\beta_1$, or other combinations.

The reference platform TCP' of the additional (measuring) kinematic system thus is determined in the X-Y-Z space by the determination of, for example, the position of the measuring carriage M1 and the angular positions $\alpha$, and $\beta$, of the corresponding arm.

The angular positions can be determined by conventional rotary angle transducers connected to the shafts of the rotary joint 7 (e.g., a U joint).

The measuring element ME has the following function. When the measuring carriages M1–M3 are fixedly coupled to the measuring carriages A1–A3 and the coupling of the stress-free parallel kinematic systems MA1 to MA3 is realized by the arm VA connecting the platform TCP' and the platform TCP, the length difference between the loaded parallel kinematic system L1–L3 and the stress-free parallel kinematic system MA1–MA3 must be realized differently. In this case instead of the measuring arm MA having a fixed-length, a length-adjustable arm MA is used. The change in length of the loaded parallel kinematic system, L1–L3, for example, due to thermal or force-induced changes of the length L, results in this case in a change of length of the measuring arm MA. This change is detected by the measuring element ME.

It should be noted that such a measuring arrangement is also suitable for a loaded parallel kinematic system in which the arms are telescopic arms with stationary connecting ends.

The position of the platform TCP cannot be directly determined with the measuring element LE. The measuring element LE can only detect the deviation of the linear guides G1–G3 from a line perpendicular to the base BR (reference space). Such deviations result from manufacturing errors, and from processing forces.

The angle determination $\alpha$, $\beta$ and the position z of the measuring carriage are used for determining the position xyz of the platform TCP' of the measuring arms MA1, MA2, MA3 in the space by the following equations:

$$z=z_0$$

$$x=R-\cos\beta$$

$$y=R-\sin\beta$$

wherein $z_0$=measuring carriage position; $R-I-\cos x$; I=length of the measuring arm MA; R=pivot radius of the measuring arm MA about the linear guide G. The aforementioned equations represent basic knowledge of a person skilled in the art for determining a position in space.

When the measuring carriage position z is fixedly coupled to the position of the drive carriage A1–A3 or is fixed within the space, the length of the telescopic arm MA1 is corrected with the aid of the measuring element with the measured value A1 as follows:

$$I = I_\beta = \Delta I$$

wherein $I_\beta$=base length of the telescopic arm MA in the retracted position. Otherwise, the same equation as mentioned above are being used.

BRIEF DESCRIPTION OF THE DRAWINGS

The invention will be explained with the embodiments represented in the drawings. It is shown in.

DESCRIPTION OF THE PREFERRED EMBODIMENTS

Figure 1:
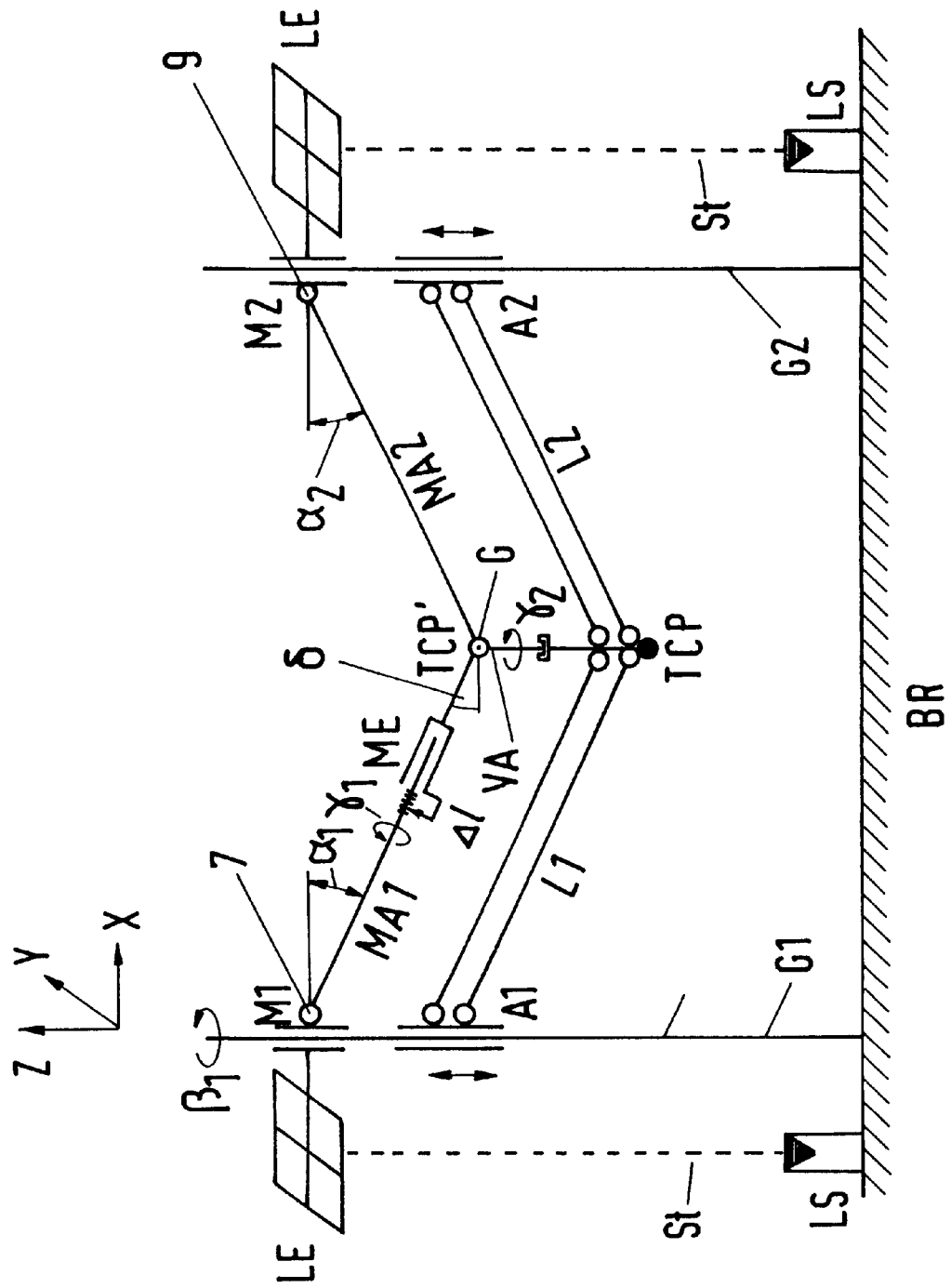
FIG. 1 the inventive device in a schematic representation and in a side view.

The apparatus allows to design spatial machine kinematic systems in order to move a platform TCP (tool center point) in space. In FIG. 1, for reasons of simplification, this platform TCP is illustrated as a point. It may serve as a tool holder or as a workpiece holder of a machine tool. The connection of the platform TCP can be achieved by differently designed kinematic arrangements of parallel rods, having respectively three degrees of freedom. In the illustration an arrangement with two rods L1, L2 is shown, having a constant length and having at the connecting point to the frame a translatory degree of freedom z and two rotatory degrees of freedom $\alpha$, $\beta$. As a matter of principle, the present arrangement functions also for all other possible degrees of freedom of the connecting points, such as one rotation, two translations, three translations, translations in the x, y or z direction.

Figure 2:
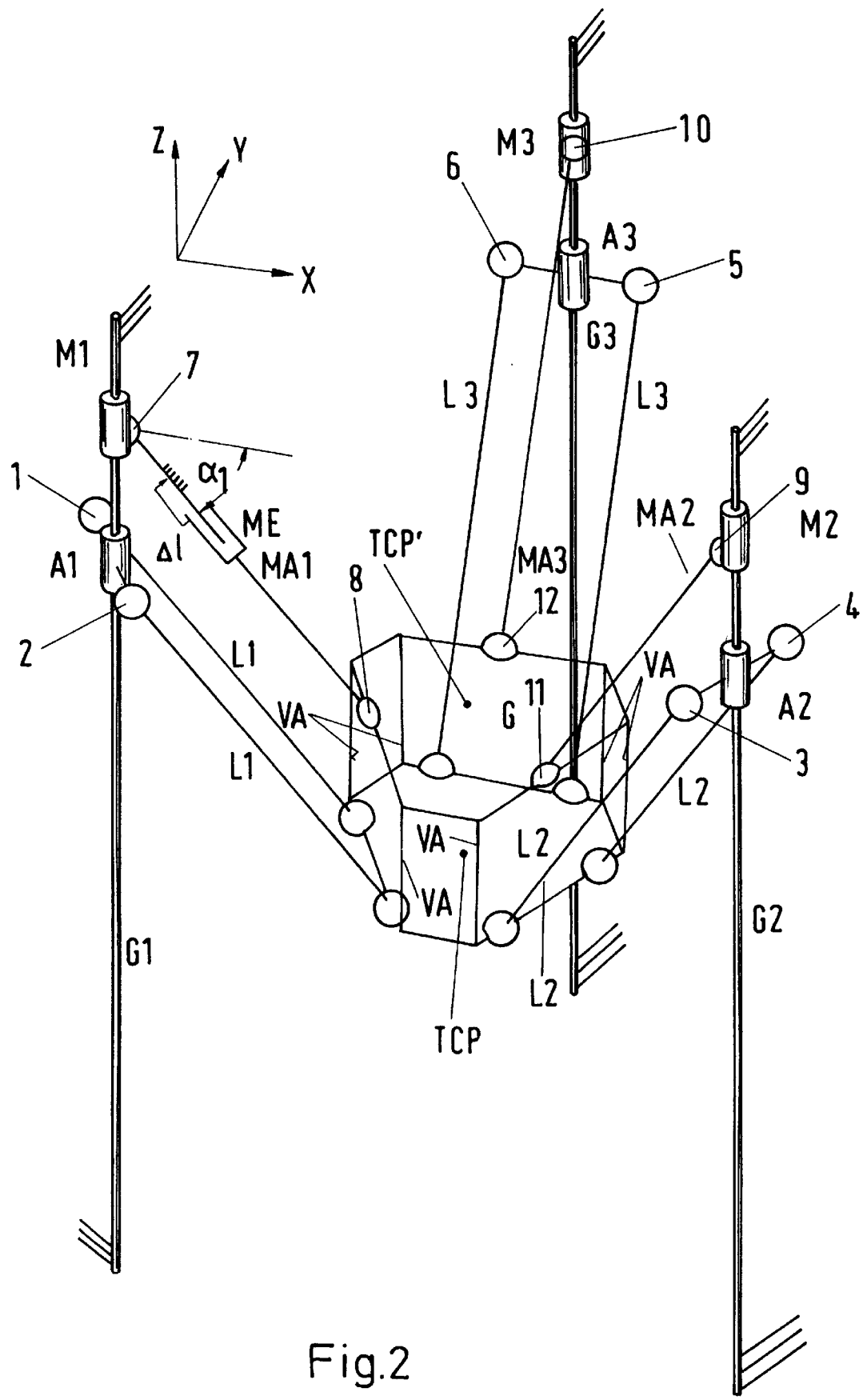
FIG. 2 the device according to FIG. 1 in a perspective representation.

The exemplary device in perspective representation according to FIG. 2 has three parallel linear guides G1 through G3 extending in the z direction and forming part of a frame of a machine tool. The linear guides G1 through G3 can also be positioned at an angle to one another so that they are no longer parallel. A respective drive carriage A1 through A3 is positioned on each one of the linear guides G1 through G3 and movable thereat. Each drive carriage A1 through A3 has correlated therewith two pivot points 1, 2; 3, 4; 5, 6. At the pivot points 1, 2 of the drive carriage A1 the ends of arms L1 are connected, the other ends of which are pivotably connected to the platform TCP. The pivot points 3, 4 and 5, 6 of the drive carriages A2 and A3 are also pivotably connected by a respective arm L2 and L3 to the platform TCP. The arms L1 through L3 have a constant length and are a part of a parallel rod kinematic system.

A measuring carriage M1 through M3 is movable respectively on each linear guide G1 through G3. It is positioned in the representation according to FIG. 1 and 2 at a spacing above the respective drive carriages A1 through A3. This arrangement is only meant as an example. The measuring carriages can also be guided on independent linear guides, and, in the case of measuring arms that have an adjustable length, the measuring carriages can be replaced by fixed frame points.

The platform TCP has coordinated therewith a reference platform TCP' connected thereto by fixed connecting arms VA. The connecting arms VA extend parallel to the linear guides G1 through G3. The reference platform TCP' which in the representation of FIG. 1 for reasons of simplification is represented only as a point, can have the same shape as the platform TCP. One end of a measuring arm MA1 is pivotably connected to the measuring carriage M1 by a ball joint 7, the other end is connected by a ball joint 8 to the reference platform TCP'. Within the measuring arm MA1 measuring elements ME are provided with which, in addition to the longitudinal change of the measuring arm MA1, all reference angles with respect to the linear guide $\alpha$, $\beta$ as well as to the reference platform TCP' $\delta$, $\gamma_1$, $\gamma_2$ are detected.

Should the measuring locations at the measuring arm MA1 be insufficient for determining the position and orientation of TCP', further, for example, identical measuring arms with other reference points can be installed. In FIG. 2, two further measuring arms MA2 and MA3 of constant length are mounted so that via the position of the carriages M2 and M3 two additional measuring information values are available and at the measuring arm M1 two measuring values can be eliminated.

The measuring carriage M2 and M3 are connected by a ball joint 9 and 10, respectively, to one end of the measuring arms MA2 and MA3 whose ends are pivotably connected by ball joints 11 and 12 to the reference platform TCP'.

The measuring arm MA1 having measuring elements ME is positioned between two reference locations, i.e., the reference platform TCP' and the measuring carriage M1, respectively, the corresponding joints 8 and 7. When the measuring carriage M1 is fixedly coupled to the drive carriage A1, a displacement of the platform TCP relative to its nominal position will be noticeable by a change of the angles of the measuring arm $\alpha_1$ and $\beta_1$ in addition to a change in length (FIG. 1). The angle $\alpha_1$ is measured between the measuring arm MA1 and a horizontal line extending through the pivot point 7 of the measuring carriage M1. The angle $\beta_1$, (FIG. 1) is the angle measured by rotation of the measuring arm MA1 about the z axis. The two measuring arm angles $\alpha_1$ and $\beta_1$ are thus the angular positions of the measuring arm MA1 relative to the plane x-y extending perpendicularly to the drive direction z. As a result of the angle changes, the length of the measuring MA1 also changes which is detected by the measuring element ME. In FIGS. 1 and 2 this change in length is indicated with I between the two reference points TCP' and the connecting point 7 of the measuring arm MA1 at the measuring carriage M1. The positional values $\alpha_1$, $\beta_1$ and I can be used to determine the relative length of the point TCP' relative to the connecting point 7 of the measuring arm MA1.

In order to determine the absolute position within the reference space BR, i.e., the mounting location of the corresponding machine, the position of the connecting point 7 of the measuring arm MA1, respectively, of the measuring carriage M1 must be determined. This position detection in the z direction can be performed, for example, by the already required measuring scale for the position-controlled drive carriage A1. Furthermore, the position detection is performed relative to the deviations in the horizontal x-y plane relative to the nominal position with the aid of a beam positioning measuring device. Such a deviation from the nominal position can be the result of, for example, deflection forces, acceleration forces, thermal expansion of the different force-transmission arms etc. Each one of the drive carriages A1 through A3 has therefore coordinated therewith such a beam positioning measuring system so that deviations of the frame position of all measuring arms from their nominal position can be determined reliably. Each beam positioning measuring system has a sender LS which has a fixed position within the reference space BR. The sender LS emits a beam which extends parallel to the ideal extension of the drive direction z. In the represented embodiment the beams St extend parallel to the linear guides G1 through G3. A receiver LE is respectively provided at each one of the measuring carriages M1 through M3, whereby the receiver has the form of an x-y array and is arranged in the x-y plane. When the linear guides G1, G2 are in their ideal or nominal position, the beam St emitted by the sender LS will impinge, for example, on the intercept of a crossing point of the x-y array (FIG. 1). Since the different arms are connected in the afore described manner to the platform TCP, it therefore is also in the desired nominal position. When deviations in the position of the platform TCP occur, this can be detected in the afore described manner by the measured values $\alpha_1$, $\beta_1$, and I. These undesirable deformations can also result in that the receiver LE can be deflected at the respective measuring carriages M1 through M3. This has the result that the beams St emitted by the senders LS no longer will impinge on the nominal location at the receiver LE. The deviation between the nominal location and the actual location serves as a guide for correction of the position determination in the x-y plane of the respective measuring carriage M1 through M3 in the reference space BR.

For determining the orientation of the connecting arm VA between the platform TCP and the reference platform TCP' this arm is connected by a joint G with the reference platform TCP' (FIG. 1). The connecting arm VA has a rotary joint that is embodied such that the part of the connecting arm VA connected to the reference platform TCP' can be rotated by an angle $\gamma_2$ relative to the part of the connecting arm connected to the platform TCP. Furthermore, the measuring arm MA1 is provided with a rotary joint for rotation about an angle. The part of the measuring arm MA1 connected to the measuring carriage M1 can thus be rotated about its axis by the αangle $\gamma_1$ relative to the part of the measuring arm MA1 connected to the reference platform TCP'. By knowing the position and orientation of the measuring arm MA1 at the reference platform TCP' and the angular positions of $\gamma_1$, $\delta$ and $\gamma_2$ the orientation of the connecting arm VA in the reference space can be determined in a simple manner. Another way of determining the orientation can be performed according to FIG. 2 by determining the position of the platform plane TCP' via the detection of the position of the points 8, 11, 12. When the plane position of TCP' is known, its orientation can be determined.

In the scenarios described above, the respective measuring carriage M1 through M3 was coupled with the respective drive carriages A1 through A3 so that the respective measuring carriage did not have a drive but was entrained by the drive carriages. When the position of the measuring carriages M1 through M3 is released, i.e., the coupling between the measuring carriages and the drive carriages is eliminated, the measuring system for determining the change in length I of the measuring arm MA1 can advantageously be eliminated. The measuring arm MA1 has a constant length so that the reference platform TCP' displaces the measuring carriage M1 in the respective z position. This also allows for a simple monitoring and correction of the nominal position of the platform TCP.

Inasmuch as certain degrees of freedom of the measuring arm are not detected, they can be replaced by detecting the degrees of freedom of further measuring arms which are aligned between other reference locations. For example, according to FIG. 1 the detection of the change in length I of the measuring arm MA1 can be determined by installation of a second identical arm MA2 between the reference platform TCP' and the measuring carriage M2 for measuring carriage M1 fixedly coupled to the drive carriage A1. The angular position $\alpha$ relative to the x-y plane can then be determined.

When the reference platform TCP' can be positioned without connecting arm VA relative to the platform TCP, for example, by movement of the reference platform TCP' by a kinematic design identical to the one at the load platform TCP, and the measuring carriages M1, M2, M3 are coupled with the corresponding drive carriages A1, A2, A3, a determination of the position of the platform TCP can be based on a differential measurement between the reference platform TCP' and the platform TCP.

In the disclosed embodiments the load-free measuring arm MA1, MA2, MA3 is used for position determination of the platform TCP. The measuring arm can be freely aligned between two reference points or reference lines. The position of the degrees of freedom of this measuring arm MA1, MA2, MA3 relative to its reference points or reference lines can be determined, and one of the reference points can be correlated with the platform TCP and the other can be correlated with a known position of the frame defined by the linear guides G1 through G3. With the disclosed apparatus the position of the platform TCP can be detected in a simple and reliable manner. Furthermore, with the apparatus the orientation of the disclosed parallel rod kinematic systems defined by the platform TCP and the reference platform TCP' can be determined in the afore described manner by the load-free measuring arms MA1 or MA2 or MA3. In the disclosed embodiment the apparatus has three parallel rod kinematic systems which have respective arms L1 through L3. Within the respective parallel rod kinematic systems they extend parallel to one another and are connected with their ends pivotably to the platform TCP and with the other ends pivotably to the respective drive carriages A1 through A3. The rods or arms L1 through L3 are pivotably supported with three degrees of freedoms at the drive carriages A1 through A3. The position of the platform TCP within the space is determined by the parallel rod kinematic systems whose arms L1 through L3 have a constant length and which are provided with linear drives A1 through A3. By movement of the drive carriages A1 through A3 along the linear guides G1 through G3 of the frame, the platform TCP can be adjusted in the desired position.

The present invention is, of course, in no way restricted to the specific disclosure of the specification and drawings, but also encompasses any modifications within the scope of the appended claims.

What is claimed is:

1. An apparatus for detecting the position of a holder for a tool or a workpiece, said apparatus comprising:

a frame;

drive units connected to said frame;

a plurality of rods being part of a parallel rod kinematic system, wherein said rods are arranged in pairs and wherein in each one of said pairs said rods extend parallel;

each one of said pairs connecting one of said drive units to said holder;

load-free measuring arms freely aligned between two measuring points and each extending parallel to one of said pairs such that a load-free kinematic system is arranged parallel to said parallel rod kinematic system;

means for detecting a position of at least one of said measuring arms within a reference space.

2. An apparatus according to claim 1, further comprising a measuring carriage connected to said frame, wherein a first end of said at least one measuring arm is connected to said measuring carriage and wherein said measuring carriage defines a first one of said two measuring points.

3. An apparatus according to claim 2, wherein said frame comprises a guide and wherein said measuring carriage is moveable on said guide along a guide path.

4. An apparatus according to claim 2, wherein a second end of said measuring arm is connected to a reference element correlated with said holder, wherein said reference element defines a second one of said two measuring points.

5. An apparatus according to claim 2, wherein said first end of said measuring arm is pivotably connected to said measuring carriage.

6. An apparatus according to claim 2, wherein said measuring carriage is coupled to one of said drive units.

7. An apparatus according to claim 4, wherein said a reference element is connected by at least one connecting arm to said holder, wherein said measuring arm comprises measuring elements for measuring a longitudinal change of said measuring arm, an angle between said measuring arm and a guide path of said guide, an angular position of said measuring arm perpendicular to said guide path, a torsion angle between said first and said second end of said measuring arm, and a torsion angle of said at least one connecting arm.

8. An apparatus according to claim 3, wherein said measuring carriage is moveable along said guide by said measuring arm independent of said drive units, wherein said measuring arm has a fixed length.

9. An apparatus according to claim 3, further comprising at least one independent position measuring system for determining the position of said measuring carriage in a plane extending transversely to said guide path.

10. An apparatus according to claim 9, wherein said plane extends at a right angle to said guide path.

11. An apparatus according to claim 9, wherein said at least one position measuring system comprises at least one sender stationarily positioned within said reference space.

12. An apparatus according to claim 9, wherein said at least one position measuring system comprises at least one receiver connected to said measuring carriage.

13. An apparatus according to claim 12, wherein said at least one receiver is an X-Y array.

14. An apparatus according to claim 4, wherein said reference element is connected to said holder by a least one connecting arm.

15. An apparatus according to claim 14, wherein said at least one connecting arm comprises a joint rotatable about a longitudinal axis of said at least one connecting arm.

16. An apparatus according to claim 14, wherein said at least one connecting arm is pivotably connected to said reference element.

17. An apparatus according to claim 14, wherein said at least one connecting arm is arranged parallel to a movement path of said drive units.

18. An apparatus for detecting the position of a holder for a tool or a workpiece, said apparatus comprising:

a frame;

drive units connected to said frame;

rods connecting said drive units to said holder;

at least one load-free measuring arm freely aligned between two measuring points;

means for detecting a position of said at least one measuring arm within a reference space;

wherein said rods are arranged as parallel kinematic units and each one of said parallel kinematic units is pivotably connected to one of said drive units and said holder.

19. An apparatus for detecting the position of a holder for a tool or a workpiece, said apparatus comprising:

a frame;

drive units connected to said frame;

rods connecting said drive units to said holder;

at least one load-free measuring arm freely aligned between two measuring points;

means for detecting a position of said at least one measuring arm within a reference space;

auxiliary measuring arms having reference points correlated therewith, wherein said auxiliary measuring arms have degrees of freedom used for determining the position and orientation of said holder.

* * * * *